(12) United States Patent
Kim et al.

(10) Patent No.: US 7,935,315 B2
(45) Date of Patent: *May 3, 2011

(54) REFORMER FOR A FUEL CELL SYSTEM, REACTION SUBSTRATE THEREFOR, AND MANUFACTURING METHOD FOR A REACTION SUBSTRATE

(75) Inventors: Ju-Yong Kim, Suwon-si (KR); Zin Park, Suwon-si (KR); In-Hyuk Son, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 936 days.

This patent is subject to a terminal disclaimer.

(21) Appl. No.: 11/326,024

(22) Filed: Jan. 4, 2006

(65) Prior Publication Data

US 2006/0143982 A1 Jul. 6, 2006

(30) Foreign Application Priority Data

Jan. 5, 2005 (KR) .................. 10-2005-0000762

(51) Int. Cl.
 *B01J 8/04* (2006.01)
(52) U.S. Cl. ........ 422/190; 422/211; 422/198; 422/188; 422/189; 422/212; 422/187; 422/191; 422/196; 423/652; 423/648.1; 429/19; 48/61
(58) Field of Classification Search .................. 422/198, 422/211
 See application file for complete search history.

(56) References Cited

U.S. PATENT DOCUMENTS

| | | | | |
|---|---|---|---|---|
| 5,082,752 A | * | 1/1992 | Koga et al. ............... | 429/20 |
| 6,033,634 A | * | 3/2000 | Koga ......................... | 422/198 |
| 7,407,636 B2 | * | 8/2008 | Kim et al. .................. | 422/198 |
| 7,514,167 B2 | * | 4/2009 | Gorobinskiy ............... | 429/412 |
| 7,691,509 B2 | * | 4/2010 | Han et al. .................. | 429/457 |
| 7,758,987 B2 | * | 7/2010 | Kim et al. .................. | 429/423 |
| 2002/0071797 A1 | | 6/2002 | Loffler et al. | |
| 2002/0131919 A1 | * | 9/2002 | DeBellis et al. ............ | 422/188 |
| 2003/0022052 A1 | | 1/2003 | Kearl | |
| 2003/0105172 A1 | * | 6/2003 | Bowe et al. ................ | 518/728 |
| 2004/0076562 A1 | * | 4/2004 | Manzanec et al. .......... | 422/211 |
| 2004/0105789 A1 | * | 6/2004 | Yamamoto .................. | 422/130 |
| 2005/0191533 A1 | * | 9/2005 | Kim et al. .................. | 429/20 |
| 2005/0191534 A1 | * | 9/2005 | Kim et al. .................. | 429/20 |
| 2005/0193628 A1 | * | 9/2005 | Kim et al. .................. | 48/198.7 |

(Continued)

FOREIGN PATENT DOCUMENTS

CN 1716676 A 1/2006

(Continued)

OTHER PUBLICATIONS

European Search Report for corresponding application No. 06100116.0-2119; dated Aug. 30, 2006.

(Continued)

*Primary Examiner* — Alexa D. Neckel
*Assistant Examiner* — Kaity V. Handal
(74) *Attorney, Agent, or Firm* — Christie, Parker & Hale, LLP (57) ABSTRACT

A reformer for a fuel cell system includes at least one reaction substrate having a channel for allowing fuel to flow on a surface thereof; and a close contact assembly closely contacted with a surface of the reaction substrate to form a passage by the channel, wherein the reaction substrate includes aluminum.

9 Claims, 10 Drawing Sheets

U.S. PATENT DOCUMENTS

| | | | |
|---|---|---|---|
| 2005/0210748 A1* | 9/2005 | Lee | 48/127.9 |
| 2005/0214614 A1* | 9/2005 | Han | 429/32 |
| 2005/0238944 A1* | 10/2005 | Lee et al. | 429/38 |
| 2005/0244685 A1* | 11/2005 | Kim et al. | 429/20 |
| 2005/0252002 A1 | 11/2005 | Lee et al. | |
| 2005/0252081 A1 | 11/2005 | Kim et al. | |
| 2005/0284022 A1 | 12/2005 | Lim | |
| 2006/0008684 A1 | 1/2006 | Park et al. | |
| 2006/0127729 A1* | 6/2006 | Roscoe et al. | 429/34 |
| 2007/0183947 A1* | 8/2007 | Lee et al. | 422/211 |

FOREIGN PATENT DOCUMENTS

| | | |
|---|---|---|
| JP | 2003-507288 | 2/2003 |
| JP | 2003-507291 | 2/2003 |
| JP | 2003-212507 | 7/2003 |
| JP | 2003-340280 | 12/2003 |
| JP | 2004-537392 | 12/2004 |
| KR | 10-2004-0049416 * | 6/2004 |
| WO | WO 01/37988 A1 | 5/2001 |
| WO | WO 02/066370 A2 | 8/2002 |
| WO | WO 2005/003025 A2 | 1/2005 |

OTHER PUBLICATIONS

U.S. Office action dated May 16, 2007, for related U.S. Appl. No. 11/123,345 (Now Patent 7,407,636), noting listed reference in this IDS.

U.S. Office action dated Oct. 30, 2007, for related U.S. Appl. No. 11/123,345 (Now Patent 7,407,636).

* cited by examiner

REFORMER FOR A FUEL CELL SYSTEM, REACTION SUBSTRATE THEREFOR, AND MANUFACTURING METHOD FOR A REACTION SUBSTRATE

CROSS REFERENCE TO RELATED APPLICATION

This application claims priority to and the benefit of Korean Patent Application No. 10-2005-0000762, filed on Jan. 5, 2005, which is hereby incorporated by reference for all purposes as if fully set forth herein.

BACKGROUND OF THE INVENTION

1. Field of the Invention

The present invention relates to a reformer for a fuel cell system and, more particularly, to a plate type reformer.

2. Description of the Related Art

A fuel cell is a system for producing electric power by generating electric energy through the electrochemical reaction of oxygen and hydrogen contained in hydrocarbon-group materials, such as methanol, ethanol and natural gas.

A polymer electrolyte membrane fuel cell (PEMFC) has been developed recently. The PEMFC has excellent output characteristics, low operating temperature, and fast starting and response characteristics. The PEMFC may be used as a mobile power source for vehicles, as a distributed power source for homes and buildings, or as a portable power source such as for electronic devices. The PEMFC, therefore, has a wide range of applications.

The components of the PEMFC are a stack, reformer, fuel tank, and fuel pump. The stack forms an electric generating aggregate of a plurality of unit fuel cells. The fuel pump supplies fuel in the fuel tank to the reformer. The reformer reforms the fuel to create a reformed gas containing hydrogen, and supplies the reformed gas to the stack. In addition, air is supplied to the stack through a separate pump.

Accordingly, the stack generates the electric energy through the electrochemical reaction of oxygen contained in air and hydrogen contained in the reformed gas.

The reformer generates hydrogen from fuel through a chemical catalytic reaction using thermal energy, and it has a thermal source assembly for generating thermal energy. A reforming reactor is used for absorbing the thermal energy and generating hydrogen from the fuel, and a carbon monoxide reduction assembly reduces the concentration of carbon monoxide contained in the reformed gas.

However, in the reformer of the conventional fuel cell system, the thermal source assembly, reforming reactor, and carbon monoxide reduction assembly have reaction vessel shapes with predetermined inner spaces respectively. To increase the volume of the reformer, each corresponding inner space would need to be increased, creating an overall larger reformer and fuel cell. Therefore, there is a need for a compact reformer to minimize the overall fuel cell system structure.

SUMMARY OF THE INVENTION

One embodiment of the invention is a reformer for a fuel cell system which allows the overall size to be compact.

Another embodiment provides a reaction substrate for the reformer and a manufacturing method of the reaction substrate.

According to one embodiment of the invention, a reformer for a fuel cell system comprises at least one reaction substrate having a channel for allowing fuel to flow on a surface thereof, and a close contact assembly closely contacted with the surface of the reaction substrate to form a passage by the channel, wherein the reaction substrate includes aluminum.

In a further embodiment, the reaction substrate may have a catalyst supporting layer made of alumina on the inner surface of the channel.

In another embodiment, a catalyst layer may be formed on the catalyst supporting layer.

In yet another embodiment, the close contact assembly may have a cover plate closely contacting with the surface of the reaction substrate.

In one embodiment, a plurality of the reaction substrates may be provided to be stacked, and the close contact assembly may have a cover plate closely contacting with the surface of the uppermost reaction substrate of the reaction substrates or a plurality of the reaction substrates.

In another embodiment, the reaction substrate and the close contact assembly may form a thermal source assembly to generate thermal energy through oxidation catalytic reaction of the fuel.

In a further embodiment, the reaction substrate and the close contact assembly may form a reforming reactor to generate a reformed gas containing hydrogen from the fuel through reforming catalytic reaction of the fuel by the thermal energy.

In yet another embodiment, the reaction substrate and the close contact assembly may form at least one carbon monoxide reduction assembly to perform a reduction of the concentration of carbon monoxide contained in the reformed gas.

According to one embodiment of the invention, a reaction substrate for a reformer comprises a plate-type body having a channel for allowing fuel to flow to generate hydrogen, a catalyst supporting layer formed on the inner surface of the channel, and a catalyst layer formed on the catalyst supporting layer. The body is made of a material containing aluminum, and the catalyst supporting layer is made of alumina formed by performing an oxidation treatment of the inner surface of the channel.

In another embodiment, the body may be used as a thermal source assembly, a reforming reactor, or a carbon monoxide reduction assembly of the reformer.

In addition, according to a further embodiment of the invention, a method of manufacturing a reaction substrate for a reformer comprises the steps of preparing a substrate, etching the top surface of the substrate to form a channel, performing oxidation treatment of the inner surface of the channel to form a catalyst supporting layer, and forming a catalyst layer on the catalyst supporting layer.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the embodiments of the invention, examples of which are illustrated in the accompanying drawings. The embodiments are described below to explain the invention by referring to the figures.

Figure 1:
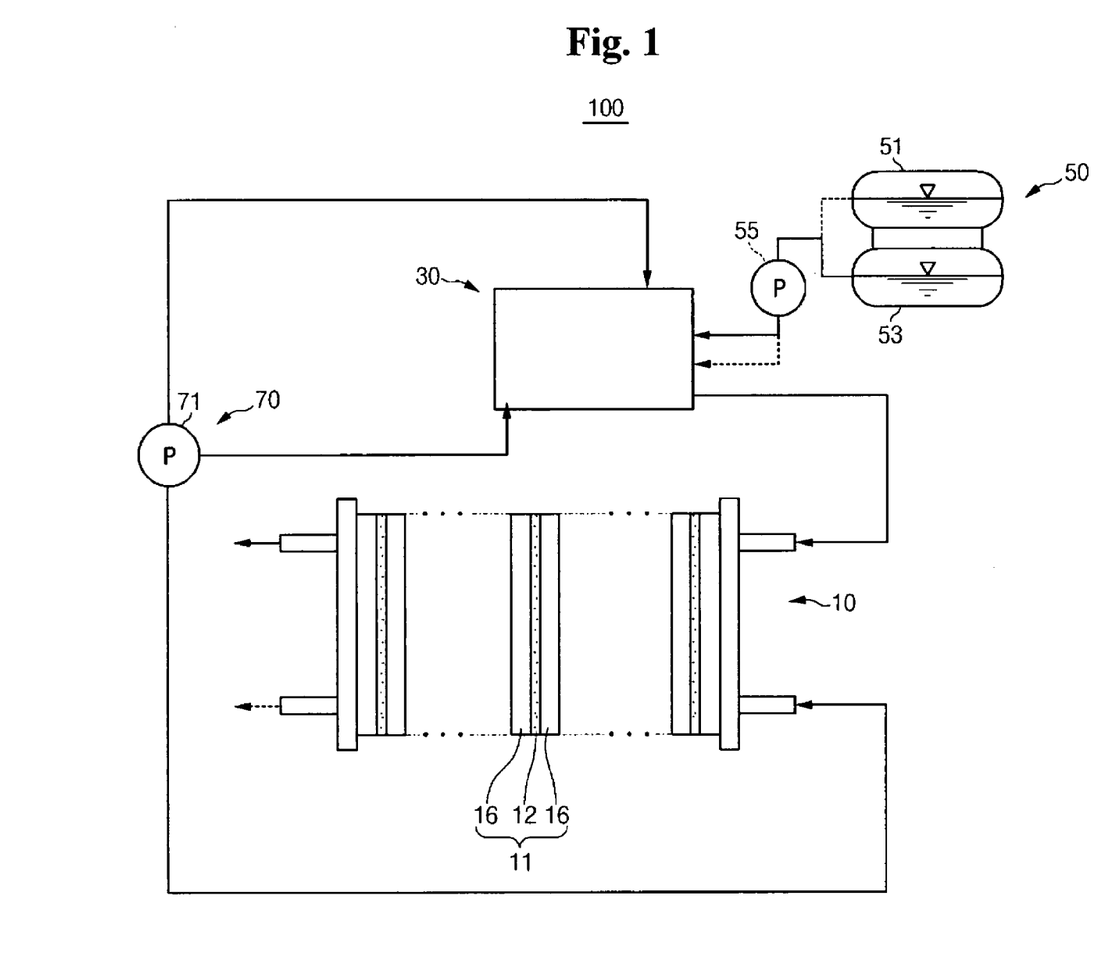
FIG. 1 is an overall schematic view of a fuel cell system according to one embodiment of the invention.
Figure 2:
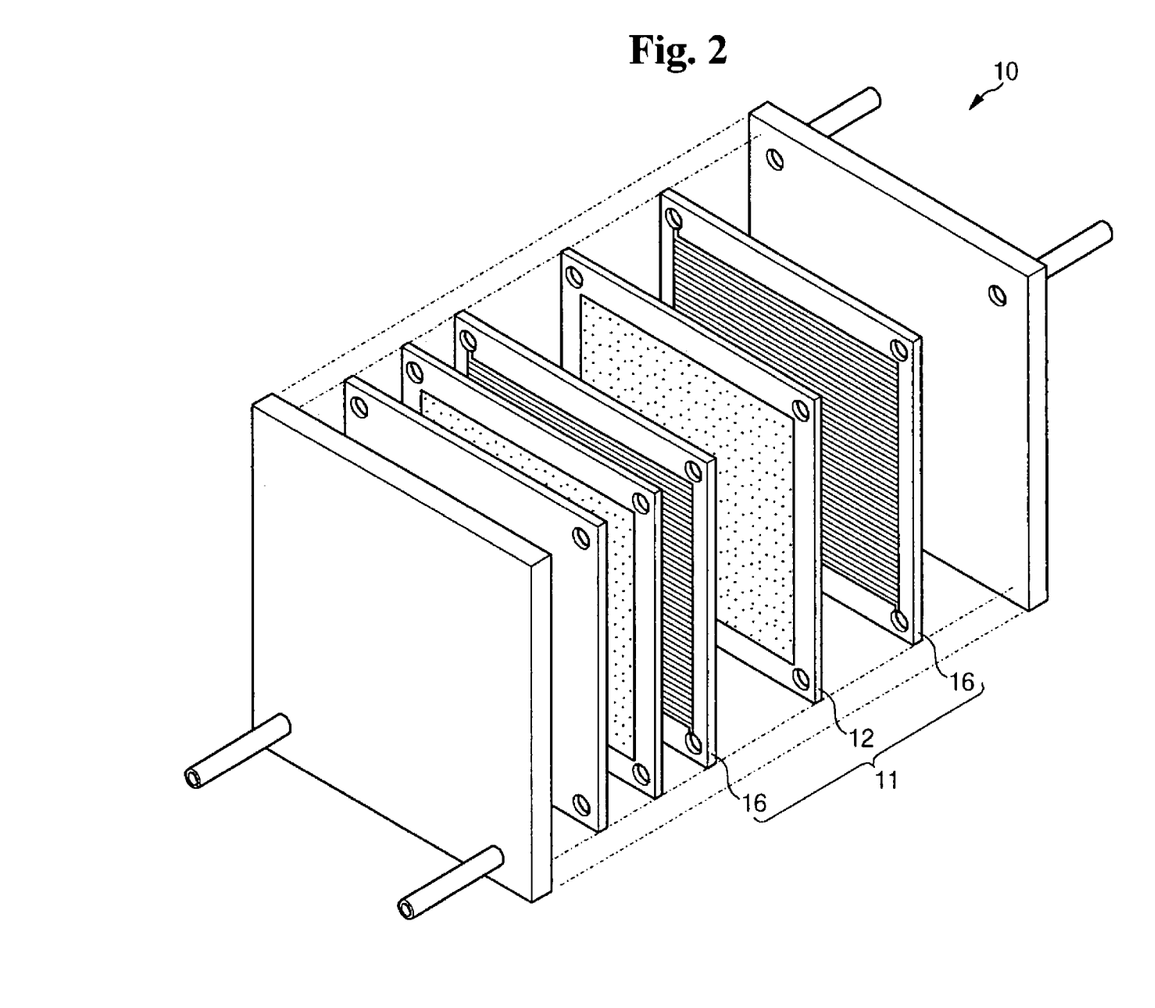
FIG. 2 is an exploded perspective view of a stack of FIG. 1.

FIG. 1 is an overall schematic view of a fuel cell system according to one embodiment of the invention, and FIG. 2 is an exploded perspective view of a stack of FIG. 1.

Referring to the embodiment shown in the drawings, in the fuel system 100 according to the invention, a polymer electrode membrane fuel cell (PEMFC) is used in which hydrogen is generated by reforming fuel containing hydrogen, and electrical energy is generated by an electrochemical reaction of the hydrogen and oxidant gas.

In the fuel system 100, fuels for generating electricity includes liquid or gas fuels such as methanol, ethanol, or natural gas. In the following embodiments, the fuel used is in liquid form for convenience.

Further, in the fuel cell system 100, the oxidant gas to react with hydrogen may be oxygen stored in a separate storage container, or it may simply be air, which contains oxygen. In the following embodiments air is used.

In one embodiment, the fuel cell system 100 includes at least one electricity generator 11 for generating electrical energy through an electrochemical reaction of hydrogen and oxygen, a reformer 30 for generating hydrogen from the liquid fuel and supplying the hydrogen to the electricity generator 11, a fuel supply assembly 50 for supplying the fuel to the reformer 30, and at least one oxygen supply assembly 70 for supplying oxygen to the reformer 30 and the electricity generator 11.

The electricity generator 11 forms a unit fuel cell with a membrane electrode assembly (MEA) 12 at its center and separators 16 (also known as bipolar plates) provided on both sides thereof.

The fuel cell system 100 has a plurality of the electricity generators 11 of the above structure, which are continuously arranged to form a stack 10. The stack 10 may have the structure of a stack in a general polymer electrolyte membrane fuel cell (PEMFC), the details of which are omitted herein.

In one embodiment, the reformer 30 is also known as a fuel processor in the fuel cell field, and the fuel supply assembly 50 for supplying fuel to the reformer 30 includes a first tank 51 for storing liquid fuel, a second tank 53 for storing water, and a fuel pump 55 connected to the first tank 51 and the second tank 53, respectively, to discharge the fuel and water.

The oxygen supply assembly 70 includes at least one air pump 71 for performing the intake of air using a predetermined pumping pressure and supplying the air to the electricity generator 11 and/or the reformer 30.

In the fuel cell system 100, the reformer 30 is supplied with the fuel, water, and air from the fuel supply assembly 50 and the oxygen supply assembly 70 to generate hydrogen. The following will describe the embodiments for the reformer 30 in detail with reference to the accompanying drawings.

Figure 3:
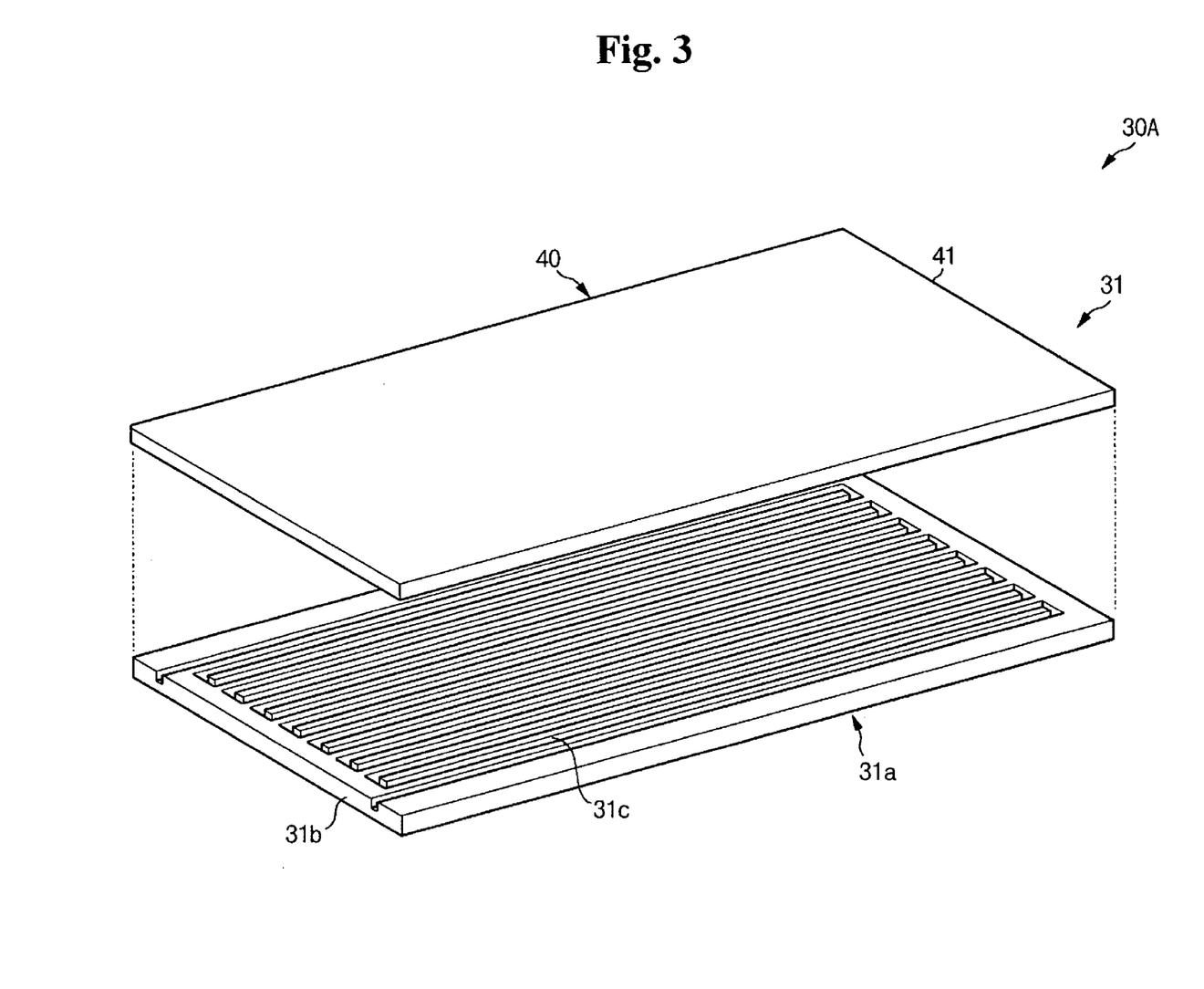
FIG. 3 is an exploded perspective view of a reformer according to one embodiment of the present invention.
Figure 4:
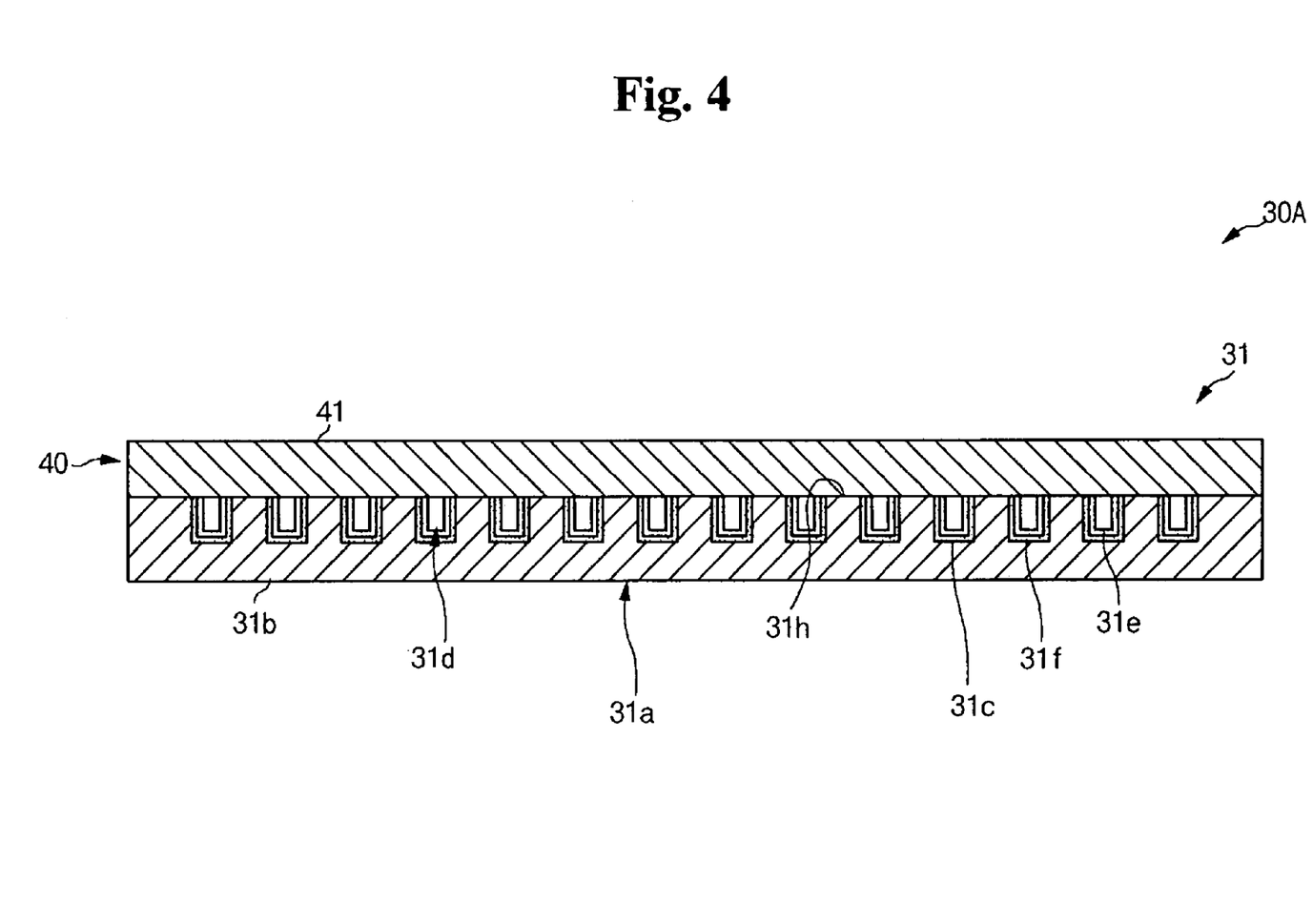
FIG. 4 is an assembled cross-sectional view of FIG. 3.

FIG. 3 is an exploded perspective view of the reformer according to one embodiment of the present invention, and FIG. 4 is an assembled cross-sectional view of FIG. 3.

Referring to the drawing, the reformer 30A according to one embodiment of the present invention has a thermal source assembly 31 to generate a predetermined thermal energy through an oxidation catalytic reaction of the fuel and air supplied from the fuel supply assembly 50 and the oxygen supply assembly 70.

According to the one embodiment, the thermal source assembly 31 includes a first reaction substrate 31a of a plate type having a first channel 31c for allowing the fuel and air to flow, and a close contact assembly 40, closely contacted with the channel forming surface of the first reaction substrate 31a to form a first passage 31d for passing the fuel and air.

The first reaction substrate 31a has a first substrate body 31b in the shape of a rectangular plate made of aluminum containing materials such as aluminum or aluminum alloy. The first channel 31c may be formed by a space between first ribs 31h protruding from the top surface of the first substrate body 31b and spaced apart at a predetermined distance. The first channel 31c is arranged in a straight line and spaced apart at a predetermined distance on the top surface of the first substrate body 31b, and both ends thereof are alternatingly connected to each other, forming a serpentine path.

A general oxidation catalyst layer 31e for accelerating an oxidation reaction of the fuel and air is formed on the inner surface of the first channel 31c, and a first catalyst supporting layer 31f for supporting the oxidation catalyst layer 31e is formed between the inner surface of the first channel 31c and the oxidation catalyst layer 31e. The first catalyst supporting layer 31f is formed as an oxide film by performing oxidation treatments on the inner surface of the first channel 31c. In one embodiment, the first catalyst supporting layer 31f is made of alumina ($Al_2O_3$).

The close contact assembly 40 has a cover plate 41 to cover the top surface of the first substrate body 31b of the first reaction substrate 31a, and a first passage 31d for passing the fuel and air is formed by the first channel 31c and a cover surface of the cover plate 41. In an embodiment, the cover plate 41 is made of the same material as that of the first reaction substrate 31a.

The reformer 30A according to one embodiment, has the thermal source assembly 31 and the close contact assembly 40. When the fuel cell system works, the fuel, water and air are supplied to the first passage 31d of the thermal source assembly 31 by operation of the fuel supply assembly 50 and the oxygen supply assembly 70. Then, the thermal source assembly 31 generates thermal energy with a predetermined temperature range through an oxidation reaction of the fuel and air by the oxidation catalyst layer 31e. The thermal energy may be supplied to a separate reformer to enable the reformer to generate hydrogen.

Figure 5:
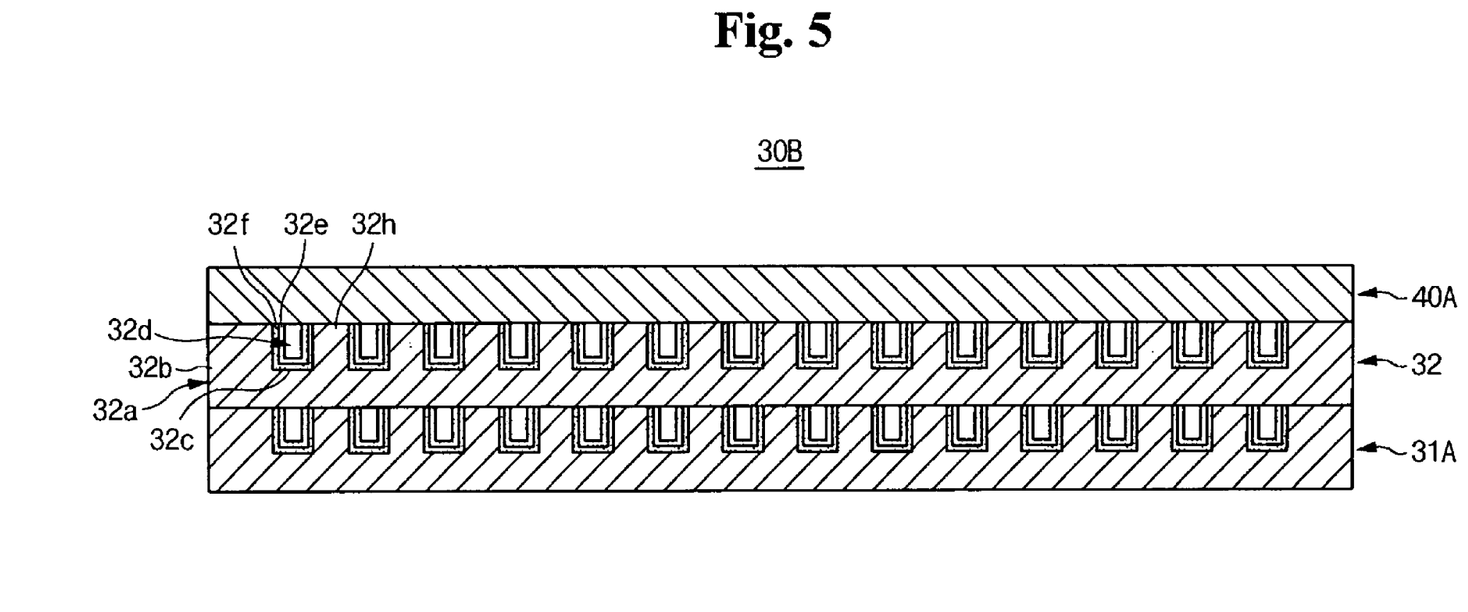
FIG. 5 is a cross-sectional view of a reformer according to one embodiment of the invention.

FIG. 5 is a cross-sectional view of a reformer 30B according to one embodiment of the invention. As shown in the drawing, the reformer 30B includes a thermal source assembly 31A with the same structure as the thermal source assembly of the embodiments above, and further includes a reforming reactor 32 to absorb thermal energy generated from the thermal source assembly 31A, and generate a reformed gas containing hydrogen from the fuel through a reforming catalytic reaction, such as a steam reforming (SR) catalytic reaction, of the fuel supplied from the fuel supply assembly 50.

According to one embodiment, the reforming reactor 32 includes a second reaction plate type substrate 32a having a second channel 32c for allowing the fuel to flow.

The second reaction substrate 31a has a second substrate body 32b of a rectangular shaped plate made of aluminum containing materials such as aluminum or aluminum alloy.

The second channel 32c may be formed by a space between second ribs 32h protruding from the top surface of the second substrate body 32b and spaced apart at a predetermined distance. The second channel 32c is arranged in a straight line spaced apart at a predetermined distance on the top surface of the second substrate body 32b, and both ends thereof are alternatingly connected to each other, forming a serpentine path.

A general steam reforming catalyst layer 32e for accelerating a steam reforming reaction of the fuel is formed on the inner surface of the second channel 32c, and a second catalyst supporting layer 32f for supporting the steam reforming catalyst layer 32e is formed between the inner surface of the second channel 32c and the steam reforming catalyst layer 32e. The second catalyst supporting layer 32f is formed as an oxide film by performing an oxidation treatment of the inner surface of the second channel 32c. In one embodiment, the second catalyst supporting layer 32f is made of alumina ($Al_2O_3$).

In addition, the reformer 30B according to one embodiment includes a close contact assembly 40A closely contacted with a channel forming surface of the second reaction substrate 32a to form a second passage 32d for passing the fuel. In one embodiment, the close contact assembly 40A may have the same cover plate as that of the close contact assembly described above.

The reformer 30B according to one embodiment comprises a thermal source assembly 31A, a reforming reactor 32, and a close contact assembly 40A. When the fuel cell system operates, the fuel and water are supplied to the second passage 32d of the reforming reactor 32 by operation of the fuel supply assembly 50. Then, the reforming reactor 32 absorbs the thermal energy generated from the thermal source assembly 31A, and generates the reformed gas, containing hydrogen from the fuel, through a steam reforming catalytic reaction of the fuel by the steam reforming catalytic layer 32e, thereby supplying it to the stack 10 shown in FIG. 1.

Figure 6:
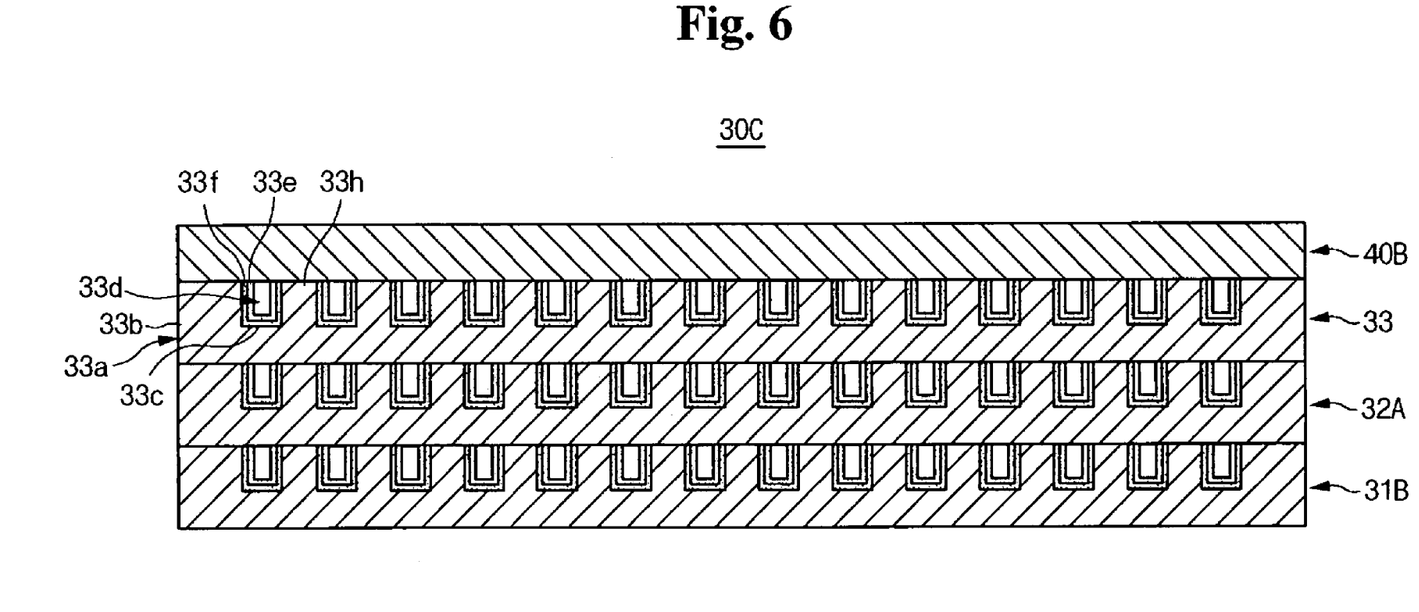
FIG. 6 is a cross-sectional view of a reformer according to one embodiment of the invention.

FIG. 6 is a cross-sectional view of a reformer 30C according to one embodiment of the invention. As shown in the drawing, the reformer 30C includes a thermal source assembly 31B, and a reforming reactor 32A with the same structure as the thermal source assembly, and a reforming reactor of an embodiment above, and may further include a first carbon monoxide reduction assembly 33 to generate additional hydrogen through a water-gas shift (WGS) catalytic reaction of the hydrogen from the reforming reactor 32A, and perform a reduction of the concentration of carbon monoxide contained in the reformed gas containing the hydrogen.

According to one embodiment, the first carbon monoxide reduction assembly 33 includes a third reaction plate type substrate 33a having a third channel 33c for allowing the hydrogen generated from the reforming reactor 32A to flow.

In one embodiment, the third reaction substrate 33a has a third substrate body 33b with a rectangular shaped plate made of aluminum containing materials such as aluminum or aluminum alloy. The third channel 33c may be formed by a space between third ribs 33h protruding from the top surface of the third substrate body 33b and spaced apart at a predetermined distance. The third channel 33c is arranged in a straight line spaced apart at a predetermined distance on the top surface of the third substrate body 33b, and both ends thereof are alternatingly connected to each other, forming a serpentine path.

A general water-gas shift catalyst layer 33e for accelerating a water-gas shift reaction of the hydrogen is formed on the inner surface of the third channel 33c, and a third catalyst supporting layer 33f for supporting the water-gas shift catalyst layer 33e is formed between the inner surface of the third channel 33c and the water-gas shift catalyst layer 33e. The third catalyst supporting layer 33f is formed as an oxide film by performing oxidation treatment of the inner surface of the third channel 33c. In one embodiment the third catalyst supporting layer 33f is made of alumina ($Al_2O_3$).

In addition, the reformer 30C according to an embodiment includes a close contact assembly 40B closely contacted with a channel forming surface of the third reaction substrate 33a to form a third passage 33d for passing the fuel. In one embodiment, the close contact assembly 40B may have the same cover plate as that of the close contact assembly described above.

The reformer 30C according to one embodiment comprises a thermal source assembly 31B, a reforming reactor 32A, a first carbon monoxide reduction assembly 33, and a close contact assembly 40B. When the fuel cell system operates, the reformed gas discharged from the reforming reactor 32A is supplied to the third passage 33d of the first carbon monoxide reduction assembly 33. Then, the first carbon monoxide reduction assembly 33 generates additional hydrogen through a water-gas shift reaction of the hydrogen by the water-gas shift catalyst layer 33e, and reduces the concentration of carbon monoxide contained in the reformed gas containing the hydrogen to thereby supply it to the stack 10 shown in FIG. 1.

Figure 7:
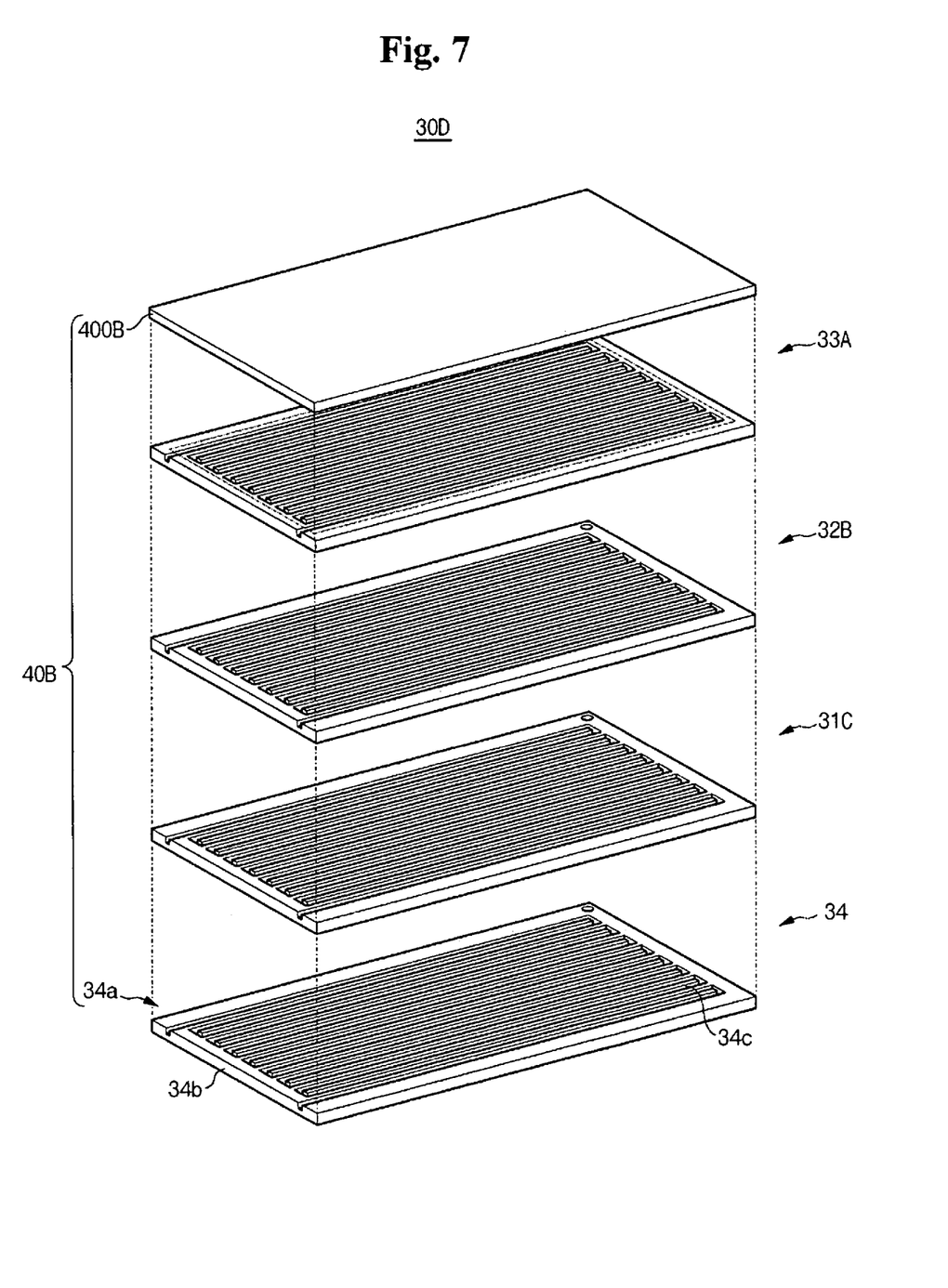
FIG. 7 is an exploded perspective view of a reformer according to one embodiment of the present invention.
Figure 8:
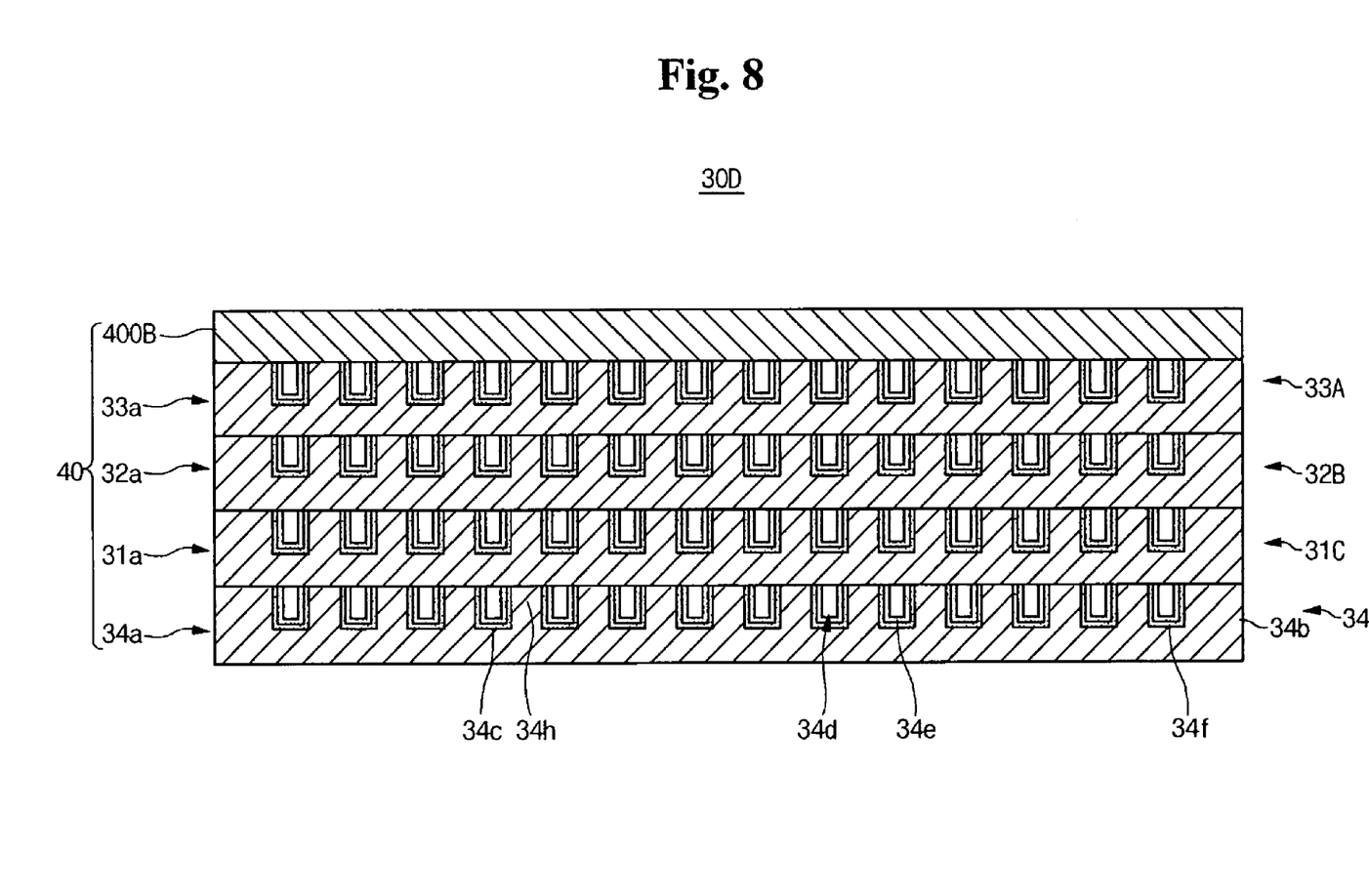
FIG. 8 is an assembled cross-sectional view of FIG. 7.

FIG. 7 is an exploded perspective view of a reformer according to one embodiment of the invention, and FIG. 8 is an assembled cross-sectional view of FIG. 7.

Referring to the drawings, the reformer 30D according to one embodiment includes a thermal source assembly 31C, a reforming reactor 32B, a first carbon monoxide reduction assembly 33A with the same structure as the thermal source assembly, a reforming reactor, a first carbon monoxide reduction assembly of the embodiments described above, and further includes a second carbon monoxide reduction assembly 34.

The second carbon monoxide reduction assembly 34 reduces the concentration of carbon monoxide contained in the reformed gas containing the hydrogen discharged from the first carbon monoxide reduction assembly 33A through a preferential CO oxidation (PROX) catalytic reaction of the hydrogen discharged from the first carbon monoxide reduction assembly 33A and the air supplied from the oxygen supply assembly 70.

The second carbon monoxide reduction assembly 34 includes a fourth plate type reaction substrate 34a having a fourth channel 34c for allowing the air and the hydrogen generated from the first carbon monoxide reduction assembly 33A to flow.

The fourth reaction substrate 34a has a fourth substrate body 34b of rectangular plate shape made of aluminum containing materials such as aluminum or aluminum alloy. The fourth channel 34c may be formed by a space between fourth ribs 34h protruding from the top surface of the fourth substrate body 34b and spaced apart at a predetermined distance. The fourth channel 34c is arranged in a straight line spaced apart at a predetermined distance on the top surface of the fourth substrate body 34b, and both ends thereof are alternatingly connected to each other, forming a serpentine path.

In one embodiment, a general preferential CO oxidation catalyst layer 34e for accelerating the preferential CO oxidation reaction of the hydrogen and the air is formed on the inner surface of the fourth channel 34c, and a fourth catalyst supporting layer 34f for supporting the preferential CO oxidation catalyst layer 34e is formed between the inner surface of the fourth channel 34c and the preferential CO oxidation catalyst layer 34e. The fourth catalyst supporting layer 34f is formed as an oxide film by performing an oxidation treatment of the inner surface of the fourth channel 34c. In an embodiment, the fourth catalyst supporting layer 34f is made of alumina ($Al_2O_3$).

The reformer 30D according to one embodiment may be a stacked reformer in which the reforming reactor 32B and the first carbon monoxide reduction assembly 33A are sequentially arranged on the upper portion of the thermal source assembly 31C, and the second carbon monoxide reduction assembly 34 is arranged in the lower portion of the thermal source assembly 31C.

In an embodiment, a close contact assembly 40B, which is included in the reformer 30D, is arranged in the first carbon monoxide reduction assembly 33A disposed in the uppermost side of the reformer 30D. The close contact assembly 40B may also have a cover plate 400B closely contacted with a channel forming surface of the reaction substrate of the first carbon monoxide reduction assembly 33A as described in the embodiments above.

Furthermore, in one embodiment, as the second carbon monoxide reduction assembly 34, the thermal source assembly 31C, the reforming reactor 32B, and the first carbon monoxide reduction assembly 33A are sequentially stacked to be closely contacted to each other, the reaction substrates of each of them may be included in the close contact assembly 40B.

This is because, as the reaction substrates are closely contacted to each other, the respective passages for the second carbon monoxide reduction assembly 34, the thermal source assembly 31C, and the reforming reactor 32B are formed.

The reformer 30D according to one embodiment further reduces the concentration of the carbon monoxide contained in the reformed gas through the second carbon monoxide reduction assembly 34 to thereby supply high quality reformed gas to the stack 10 shown in FIG. 1.

In one embodiment, although not described with a drawing, the reformer according to the invention may include only the second carbon monoxide reduction assembly without the first carbon monoxide reduction assembly with respect to the structure of the embodiments above.

As described above, the reformer according to the invention may selectively include a thermal source assembly, a reforming reactor, and a carbon monoxide reduction assembly as its structural element.

Figure 9:
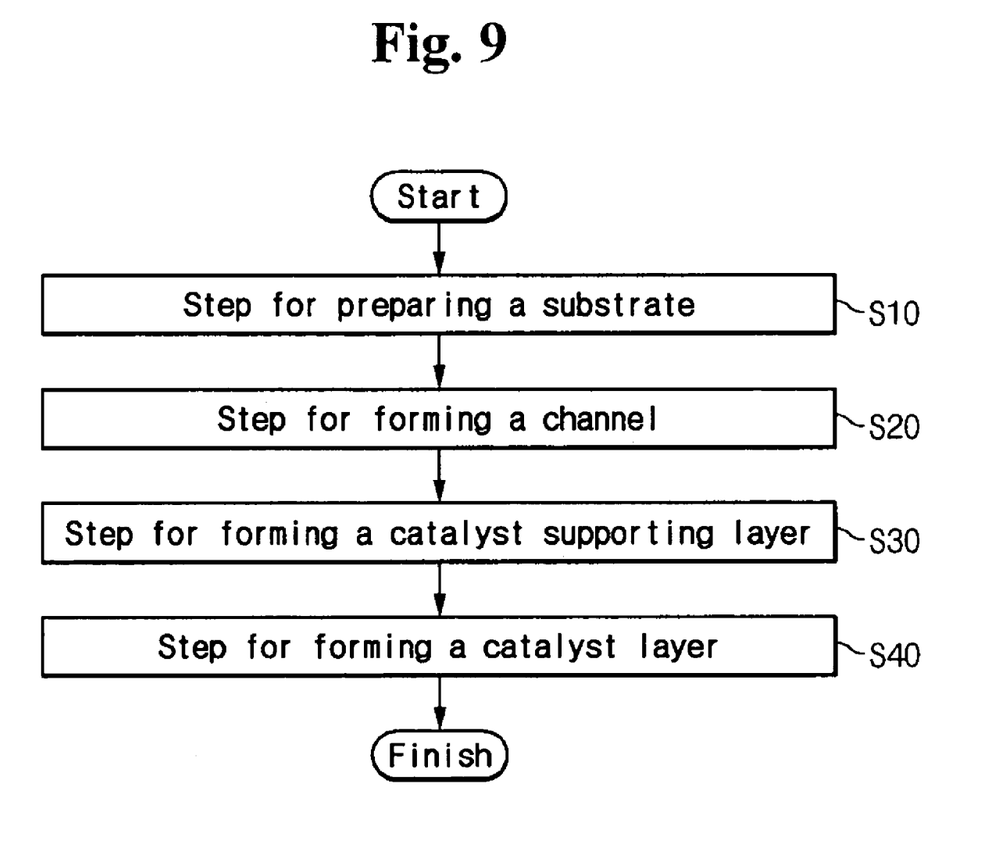
FIG. 9 is a flow chart illustrating a method of manufacturing a reaction substrate for a reformer according to one embodiment of the invention.

FIG. 9 is a flow chart illustrating a method of manufacturing a reaction substrate for a reformer according to one embodiment of the invention.

Referring to FIG. 9, a method of manufacturing a reaction substrate for a reformer of a fuel cell system according to one embodiment of the present invention comprises the steps of preparing a substrate (S10), etching the top surface of the substrate to form a channel (S20), performing an oxidation treatment of the inner surface of the channel to form a catalyst supporting layer (S30), and forming a catalyst layer on the catalyst supporting layer (S40).

FIGS. 10A to 10D are cross-sectional views of a reaction substrate for a reformer in intermediate steps of a manufacturing method thereof according to one embodiment of the invention.

Figure 10A:
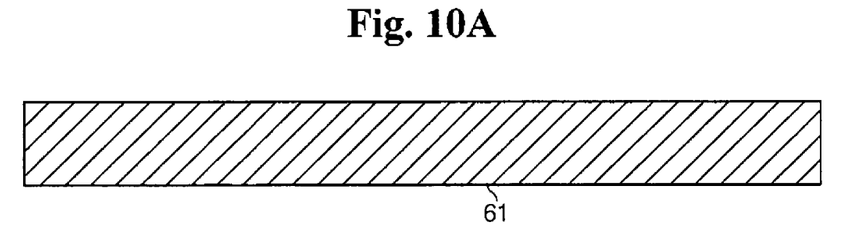
FIGS. 10A to 10D are cross-sectional views of a reaction substrate for a reformer in intermediate steps of a manufacturing method thereof according to one embodiment of the invention.

Referring to FIG. 10A, as the S10 step, a substrate 61 made of materials containing aluminum or aluminum alloy is prepared.

Figure 10B:
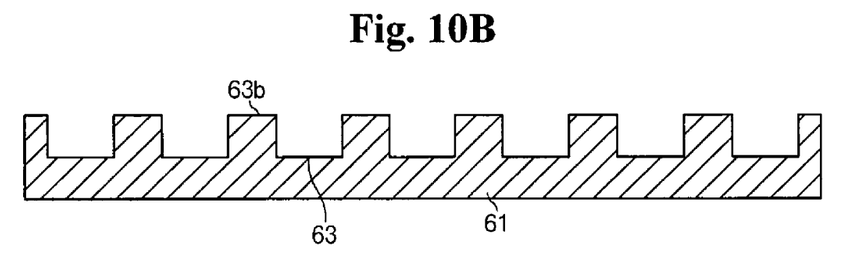

Referring to FIG. 10B, in the S20 step, a channel 63 with a predetermined length and depth is formed on the top surface of the substrate 61 by performing a general isotropic or anisotropic etching of the substrate 61. Then, ribs 63b are formed protruding from the top surface of the substrate 61 and spaced apart at a predetermined distance, and the channel 63 is formed in a space between the ribs 63b.

Figure 10C:
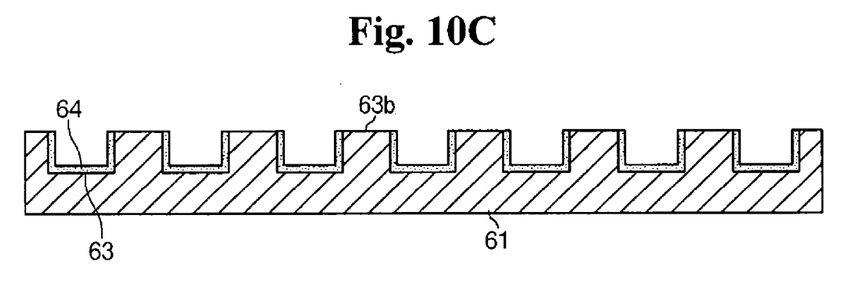

Referring to FIG. 10C, as the S30 step, the substrate 61 is oxidized in a high temperature atmosphere by a general thermal oxidation. Then, oxygen or an oxidant solution may be used as an oxidation source. In an embodiment, the inner surface of the channel 63 of the substrate 61 is oxidized by oxygen or an oxidant solution to form a film type of catalyst supporting layer 64 on the inner surface of the channel 63, and the catalyst supporting layer 64 is made of alumina ($Al_2O_3$) according to the material of the substrate 61.

Figure 10D:
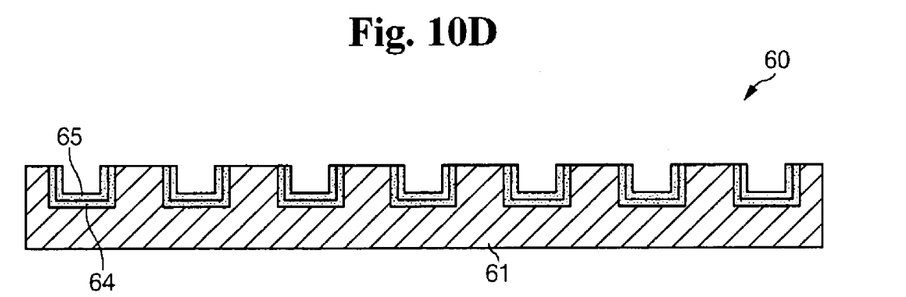

In one embodiment, referring to FIG. 10D, as the S40 step, a catalyst layer 65 is formed on the catalyst supporting layer 64 by dip coating, sputtering, or slurry methods. The catalyst layer 65 may include each of catalyst layers for accelerating the separate reactions of the thermal source assembly, the reforming reactor, and the carbon monoxide reduction assembly of the reformer of the fuel cell system.

Accordingly, the reaction substrate 60 according to an embodiment of the invention is manufactured through the sequential manufacturing steps described above.

According to an embodiment of the invention, the reformer has reaction substrates allowing fuel to flow, and the reaction substrates are stacked, which allows the reformer's size to be compact.

In addition, according to one embodiment, as the catalyst supporting layer of alumina can be formed in the channel by oxidation of the substrate body made of materials containing aluminum, the overall process for manufacturing the reaction substrate can be simplified, unlike the conventional process in which the catalyst supporting layer of different materials from the substrate body is separately coated in the channel. Accordingly, the manufacturing productivity of the fuel cell system and the reformer can be further enhanced.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer for a fuel cell system, comprising:
    a plurality of reaction substrates comprising aluminum, the plurality of reaction substrates each having a channel;
    a catalyst layer coated on a surface of the channels; and
    a close contact assembly closely contacted with at least one of the reaction substrates to form a passage through which fuel flows and comes into contact with the corresponding catalyst layer and a bare surface of the close contact assembly,
    wherein a first reaction substrate of the plurality of reaction substrates forms a thermal source assembly adapted to generate thermal energy through an oxidation catalytic reaction of a first fuel,
    wherein a second reaction substrate of the plurality of reaction substrates adjoined to the first reaction substrate forms a reforming reactor adapted to generate a reformed gas containing hydrogen through a reforming catalytic reaction of a second fuel, and wherein a third reaction substrate of the plurality of reaction substrates adjoined to the second reaction substrate on a side opposite the first reaction substrate forms a first carbon monoxide reduction assembly adapted to reduce a concentration of carbon monoxide contained in the reformed gas from the reforming reactor.

2. The reformer for a fuel cell system of claim 1, further comprising a catalyst supporting layer comprising alumina between the surface of the channels and the corresponding catalyst layers.

3. The reformer for a fuel cell system of claim 1, wherein the close contact assembly comprises a cover plate closely contacting one of the at least one reaction substrate.

4. The reformer for a fuel cell system of claim 1, wherein the plurality of reaction substrates are stacked, and wherein the close contact assembly comprises a cover plate closely contacting the uppermost reaction substrate of the plurality of reaction substrates, and wherein the passage of each of the plurality of reaction substrates other than that of the uppermost reaction substrate is formed by the catalyst layer of each reaction substrate and a bare bottom surface of a corresponding reaction substrate of the plurality of reaction substrates stacked directly above each respective reaction substrate.

5. The reformer for a fuel cell system of claim 1, wherein the reforming reactor is adapted to perform the reforming catalytic reaction of the second fuel by utilizing the thermal energy from the thermal source assembly.

6. The reformer for a fuel cell system of claim 5, wherein the second fuel has the same composition as the first fuel.

7. The reformer for a fuel cell system of claim 1, wherein the plurality of reaction substrates further comprises a fourth reaction substrate forming a second carbon monoxide reduction assembly.

8. The reformer for a fuel cell system of claim 7, wherein the fourth reaction substrate is arranged on a side of the first reaction substrate opposite the second reaction substrate and is adapted to reduce a concentration of carbon monoxide contained in the gas from the first carbon monoxide reduction assembly.

9. A reformer for a fuel cell system, comprising:
   a plurality of reaction substrates comprising aluminum, the plurality of reaction substrates each having a channel;
   a catalyst layer coated on a surface of the channels;
   a catalyst supporting layer comprising alumina between the surface of the channels and the corresponding catalyst layers; and
   a close contact assembly closely contacted with at least one of the reaction substrates to form a passage through which fuel flows and comes into contact with the corresponding catalyst layer and a surface of the close contact assembly,
   wherein a first reaction substrate of the plurality of reaction substrates forms a thermal source assembly adapted to generate thermal energy through an oxidation catalytic reaction of a first fuel,
   wherein a second reaction substrate of the plurality of reaction substrates adjoined to the first reaction substrate forms a reforming reactor adapted to generate a reformed gas containing hydrogen through a reforming catalytic reaction of a second fuel by utilizing the thermal energy from the thermal source assembly, and
   wherein third and fourth reaction substrates of the plurality of reaction substrates form carbon monoxide reduction assemblies arranged on a side of the second reaction substrate opposite the first reaction substrate and on a side of the first reaction substrate opposite the second reaction substrate, respectively.

\* \* \* \* \*